US008280607B2

(12) United States Patent
Gatti et al.

(10) Patent No.: US 8,280,607 B2
(45) Date of Patent: Oct. 2, 2012

(54) SAFELY OVERRIDING UNINTENDED ACCELERATION PROTECTION IN VEHICLES TOWING TRAILERS

(75) Inventors: Marco J. Gatti, Southgate, MI (US); Paul A. Bauerle, Fenton, MI (US)

(73) Assignee: GM Global Technology Operations LLC

( * ) Notice: Subject to any disclaimer, the term of this patent is extended or adjusted under 35 U.S.C. 154(b) by 209 days.

(21) Appl. No.: 12/828,541

(22) Filed: Jul. 1, 2010

(65) Prior Publication Data

US 2012/0004820 A1 Jan. 5, 2012

(51) Int. Cl.
*G06F 19/00* (2011.01)

(52) U.S. Cl. ............................ 701/99; 701/110

(58) Field of Classification Search .................. 701/99
See application file for complete search history.

(56) References Cited

U.S. PATENT DOCUMENTS

| | | | | |
|---|---|---|---|---|
| 4,472,777 A * | 9/1984 | Youngblood | ................ | 701/110 |
| 5,780,782 A * | 7/1998 | O'Dea | ................ | 177/136 |
| 6,419,037 B1 * | 7/2002 | Kramer et al. | ................ | 180/14.2 |
| 6,442,468 B2 * | 8/2002 | Nishimura | ................ | 701/59 |
| 7,070,247 B2 * | 7/2006 | Offerle | ................ | 303/146 |
| 7,226,389 B2 * | 6/2007 | Steen et al. | ................ | 477/195 |
| 7,447,585 B2 * | 11/2008 | Tandy et al. | ................ | 701/70 |
| 2007/0034440 A1 * | 2/2007 | Zomotor | ................ | 180/275 |

OTHER PUBLICATIONS

U.S. Appl. No. 12/764,580, filed Apr. 21, 2010, Debs et al.

* cited by examiner

*Primary Examiner* — Behrang Badii
*Assistant Examiner* — Dale W Hilgendorf

(57) ABSTRACT

A system includes a trailer sensing module, a position sensing module, a torque reducing module, and an override control module. The trailer sensing module senses when a trailer is attached to a vehicle. The position sensing module senses positions of an accelerator pedal and a brake pedal of the vehicle. The torque reducing module reduces torque output to wheels of the vehicle when both the accelerator pedal and the brake pedal are pressed. The override control module selectively deactivates the torque reducing module when the trailer is attached to the vehicle and when a speed of the vehicle is less than or equal to a threshold.

14 Claims, 3 Drawing Sheets

SAFELY OVERRIDING UNINTENDED ACCELERATION PROTECTION IN VEHICLES TOWING TRAILERS

CROSS-REFERENCE TO RELATED APPLICATIONS

This application is related to U.S. patent application Ser. No. 12/764,580 filed on Apr. 21, 2010. The disclosure of the above application is incorporated herein by reference in its entirety.

FIELD

The present disclosure relates generally to diagnostic systems of vehicles and particularly to systems and methods for safely overriding unintended acceleration protection systems in vehicles towing trailers.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a vehicle control system 100 may comprise an engine 102, a driver input module 104, and an engine control module (ECM) 106 that controls the engine 102 and a plurality of control systems of the vehicle. For example only, the control systems may include a throttle control system 108, a brake control system 110, and a transmission control system 112. The vehicle control system 100 may comprise additional control systems. The ECM 106 communicates with the engine 102, the driver input module 104, and the plurality of control systems via a cable assembly (wire harness) 101.

The control systems operate according to driver inputs sensed by the driver input module 104 and control signals received from the ECM 106. The driver inputs can include an ignition, a parking brake, a brake pedal, an accelerator pedal, a clutch pedal, a steering, and so on. Each control system may comprise one or more sensors that sense operating parameters of components controlled by the control system. The ECM 106 may receive signals indicating values of the variables. The ECM 106 may comprise calibrated values for one or more of the operating parameters. Based on the values sensed by the sensors, the calibrated values, and/or the driver inputs, the ECM 106 may generate control signals to control operations of the control systems.

For example, the throttle control system 108 may control throttle (not shown) based on inputs received from a driver via the driver input module 104 and control signals received from the ECM 106. For example, the throttle control system 108 may control the throttle based on a position of the accelerator pedal sensed by the driver input module 104. The control signals received from the ECM 106 may include a value of an operating parameter called a throttle position corresponding to the position of the accelerator pedal. The throttle control system 108 may control the throttle based on the value of the operating parameter called the throttle position.

The brake control system 110 may control brakes 114 based on inputs received from the driver via the driver input module 104 and control signals received from the ECM 106. For example, the brake control system 110 may control the brakes 114 based on a position of the brake pedal sensed by the driver input module 104. The control signals received from the ECM 106 may include a value of an operating parameter called a braking force corresponding to the position of the brake pedal. The brake control system 110 may control the brakes 114 based on the value of the operating parameter called the braking force.

The transmission control system 112 may control a transmission 116 based on inputs received from the driver via the driver input module 104 and control signals received from the ECM 106. For example, the transmission control system 112 may control the transmission 116 based on positions of the accelerator pedal, the brake pedal, and/or the clutch pedal sensed by the driver input module 104. Additionally, the transmission control system 112 may control the transmission 116 based on road conditions (e.g., gradient) sensed by other control systems. The control signals received from the ECM 106 may include a value of an operating parameter called upshift (or downshift) corresponding to the driver inputs and/or the road conditions. The transmission control system 112 may control the transmission 116 based on the value of the operating parameter called upshift (or downshift).

SUMMARY

A system comprises a trailer sensing module, a position sensing module, a torque reducing module, and an override control module. The trailer sensing module senses when a trailer is attached to a vehicle. The position sensing module senses positions of an accelerator pedal and a brake pedal of the vehicle. The torque reducing module reduces torque output to wheels of the vehicle when both the accelerator pedal and the brake pedal are pressed. The override control module selectively deactivates the torque reducing module when the trailer is attached to the vehicle and when a speed of the vehicle is less than or equal to a threshold.

In another feature, the override control module reactivates the torque reducing module when the trailer is attached to the vehicle and when the speed is greater than the threshold.

In another feature, the system further comprises a torque control module that increases torque output to the wheels based on the positions of the accelerator pedal and the brake pedal when the trailer is attached to the vehicle, both the accelerator pedal and the brake pedal are pressed, and the speed of the vehicle is less than or equal to a threshold.

In another feature, the trailer sensing module senses that the trailer is attached to the vehicle when a trailer light connector of the vehicle is plugged into a corresponding connector of the trailer.

In another feature, the threshold is less than or equal to 5 miles per hour.

In other features, the system further comprises a mass determination module that determines a mass of the trailer. The threshold is based on the mass of the trailer. The mass determination module determines the mass of the trailer based on a number of pins of a trailer light connector of the vehicle. The trailer light connector plugs into a corresponding connector of the trailer.

In still other features, a method comprises sensing when a trailer is attached to a vehicle and sensing positions of an accelerator pedal and a brake pedal of the vehicle. The method further comprises using a torque reducing system to reduce torque output to wheels of the vehicle when both the accelerator pedal and the brake pedal are pressed. The method further comprises selectively deactivating the torque reducing system when the trailer is attached to the vehicle and when a speed of the vehicle is less than or equal to a threshold.

In another feature, the method further comprises reactivating the torque reducing system when the trailer is attached to the vehicle and when the speed is greater than the threshold.

In another feature, the method further comprises increasing torque output to the wheels based on the positions of the accelerator pedal and the brake pedal when the trailer is attached to the vehicle, both the accelerator pedal and the brake pedal are pressed, and the speed of the vehicle is less than or equal to a threshold.

In another feature, the method further comprises detecting when a trailer light connector of the vehicle is plugged into a corresponding connector of the trailer and determining that the trailer is attached to the vehicle when the trailer light connector of the vehicle is plugged into a corresponding connector of the trailer.

In another feature, the method further comprises setting the threshold to less than or equal to 5 miles per hour.

In other features, the method further comprises determining a mass of the trailer and setting the threshold based on the mass of the trailer. The method further comprises determining the mass of the trailer based on a number of pins of a trailer light connector of the vehicle. The trailer light connector plugs into a corresponding connector of the trailer.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
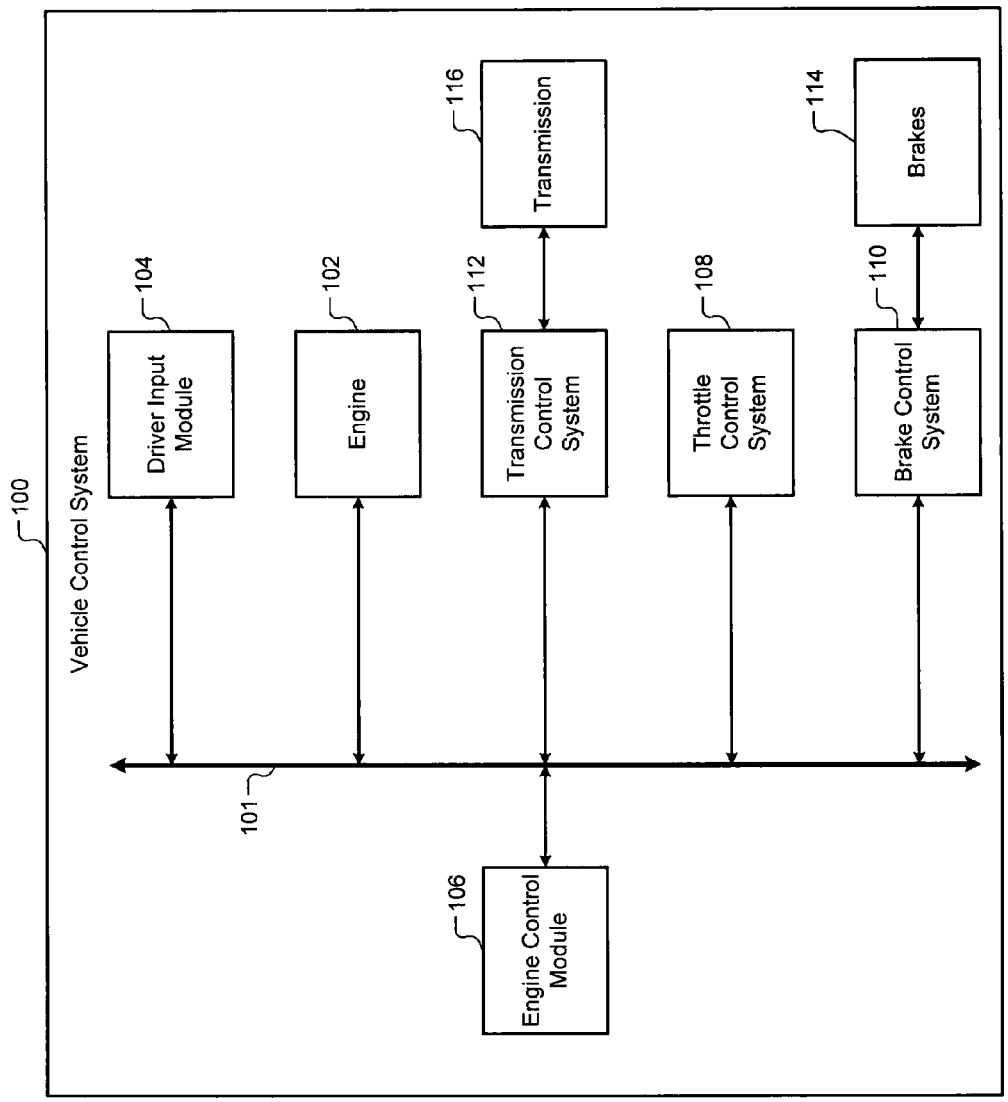
FIG. 1 is a functional block diagram of a vehicle control system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A vehicle may accidentally accelerate without driver input due to a malfunction. Unintended acceleration can be hazardous and can be mitigated in many ways. For example, the unintended acceleration can be mitigated by providing a safety system that reduces torque output to the wheels when a vehicle control system senses a high accelerator input as well as a high brake input from the driver. An example of a safety system is disclosed in U.S. patent application Ser. No. 12/764,580 filed on Apr. 21, 2010, which is incorporated herein by reference in its entirety.

Occasionally, however, the driver may need to press both the gas pedal and the brake pedal together in conditions other than unintended acceleration. For example, a vehicle towing a trailer may be headed upwards on an incline. When the vehicle is at rest or is starting from rest, the weight of the trailer may pull the vehicle backwards (i.e., downwards). To prevent the downward motion, the driver may press both the accelerator pedal and the brake pedal. After the vehicle begins moving forward, the driver may release the brake pedal and continue to accelerate.

When the vehicle towing a trailer is at rest or is starting from rest on an incline, a high torque is needed to prevent the trailer from pulling the vehicle downward and/or to move the vehicle forward from rest. Normally, the safety system will prevent high torque from being output to the wheels when the driver presses both the accelerator pedal and the break pedal. Accordingly, there is a need to temporarily override the safety system when the vehicle towing a trailer is on an incline.

One way to temporarily override the safety system is to provide a switch on a dashboard of the vehicle. The driver may use the switch to temporarily deactivate the safety system when towing a trailer on an incline. When the switch is in a first state, the safety system is deactivated, and a high torque is applied to the wheels when both the accelerator pedal and the break pedal are pressed. When the switch is in a second state, the safety system is reactivated, and torque applied to the wheels is reduced when both the accelerator pedal and the break pedal are pressed.

A switch on the dashboard, however, increases cost of the vehicle and may fail. Additionally, safety may be compromised if the driver fails to reactivate the safety system after pressing both the accelerator pedal and the break pedal is no longer necessary. The present disclosure relates to systems and methods that temporarily deactivate the safety system when a vehicle towing a trailer is at rest and is starting from rest on an incline and that automatically reactivates the safety system when the speed of the vehicle exceeds a threshold.

Figure 2A:
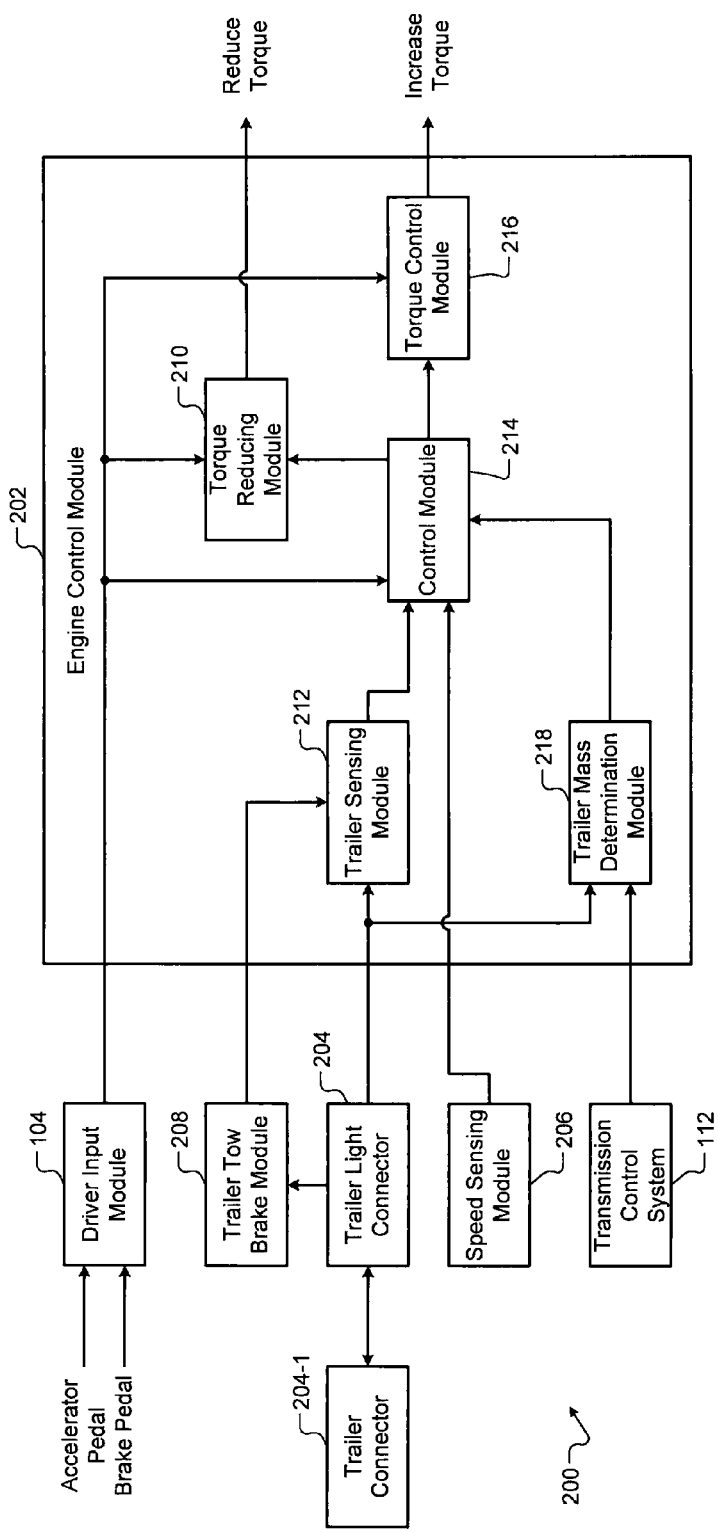
FIG. 2A is a functional block diagram of a system that safely overrides unintended acceleration protection in vehicles towing trailers according to the present disclosure.
Figure 2B:
FIG. 2B is a schematic of a trailer connector according to the present disclosure.

Referring now to FIGS. 2A and 2B, a system 200 according to the present disclosure is shown. The system 200 temporarily deactivates the safety system when a vehicle towing a trailer is at rest and is starting from rest on an incline. The system 200 automatically reactivates the safety system when the speed of the vehicle exceeds the threshold.

In FIG. 2A, the system 200 comprises the driver input module 104, the transmission control system 112, an engine control module (ECM) 202, a trailer light connector 204, a speed sensing module 206, and a trailer tow brake module 208 (optional). The trailer light connector 204 connects the vehicle to a trailer. Specifically, the trailer light connector 204 plugs into a corresponding connector of the trailer (hereinafter trailer connector 204-1). The speed sensing module 206 senses the speed of the vehicle and generates a speed signal indicating the speed of the vehicle.

The trailer tow brake module 208 may be optionally installed on the dashboard of the vehicle. If used, the trailer tow brake module 208 detects when the trailer is attached to the vehicle. Specifically, the trailer tow brake module 208 detects when the trailer light connector 204 is plugged into the trailer connector 204-1. The trailer tow brake module 208 generates a trailer detect signal when the trailer is attached to the vehicle. Additionally, the trailer tow brake module 208 controls trailer sway by controlling the amount of braking force applied to the trailer. For example, the trailer tow brake module 208 includes switches that allow the driver to control trailer brake gain.

The ECM 202 comprises a torque reducing module 210, a trailer sensing module 212, a control module 214, a torque control module 216, and a trailer mass determination module 218. The torque reducing module 210 receives driver inputs from the driver input module 104. Normally, the torque reducing module 210 generates a reduce torque signal to reduce torque output to the wheels when the driver input indicates that both the accelerator pedal and the brake pedal are pressed by the driver. This safety system mitigates unintended acceleration.

The trailer sensing module 212 senses when the trailer is attached to the vehicle. The trailer sensing module 212 generates a trailer present signal when the trailer is attached to the vehicle. The trailer sensing module 212 may determine that the trailer is attached to the vehicle in many ways. For example, the trailer sensing module 212 may determine that the trailer is attached to the vehicle when the trailer detect signal is received from the trailer tow brake module 208.

Alternatively, the trailer sensing module 212 may determine that the trailer is attached to the vehicle when the trailer light connector 204 is plugged into the trailer connector 204-1. For example, an open circuit may be closed when the trailer light connector 204 is plugged into the trailer connector 204-1. The trailer sensing module 212 may determine that the trailer is attached to the vehicle when the open circuit is closed.

An open circuit may be closed in many ways when the trailer light connector 204 is plugged into the trailer connector 204-1. For example, a load (e.g., a light bulb) in the trailer may be connected to a power supply output by the trailer light connector 204. Alternatively, as shown in FIG. 2B, a pair of connector pins of the trailer light connector 204 may be looped back using a loopback 204-2 in the trailer connector 204-1 when the trailer light connector 204 is plugged into the trailer connector 204-1. The looped back pins of the trailer light connector 204 indicate that the trailer is attached to the vehicle.

In some implementations, a switch that is normally open may be closed when the trailer light connector 204 is plugged into the trailer connector 204-1, where the closed switch indicates that the trailer is attached to the vehicle. Alternatively, a switch that is normally closed may be opened when the trailer light connector 204 is plugged into the trailer connector 204-1, where the opened switch indicates that the trailer is attached to the vehicle. Additional ways of sensing connection of the trailer to the vehicle are contemplated.

The control module 214 receives the trailer present signal from the trailer sensing module 212, the speed signal from the speed sensing module 206, and the driver inputs from the driver input module 104. When the trailer is attached to the vehicle, the control module 214 generates an override signal when the speed of the vehicle is less than or equal to a threshold and when the driver inputs indicate that the driver has pressed both the accelerator pedal and the brake pedal. For example, the control module 214 generates the override signal when the vehicle towing the trailer is at rest or is starting from rest on an incline.

The override signal deactivates the torque reducing module 210. Accordingly, the torque reducing module 210 does not generate the reduce torque signal although the driver input indicates that both the accelerator pedal and the brake pedal are pressed by the driver.

Additionally, the override signal activates the torque control module. When the override signal is received, the torque control module 216 generates an increase toque signal to increase torque output to the wheels of the vehicle. Accordingly, the driver can use both the accelerator pedal and the brake pedal to generate sufficient torque to prevent the trailer from pulling the vehicle downward and/or to move the vehicle and the trailer forward from a rest position on the incline.

When the speed signal indicates that the speed of the vehicle towing the trailer is greater than the threshold, the control module 214 reactivates the torque reducing module 210 to reinstate the safety system. Additionally, the control module 214 deactivates the torque control module 216. For example, the control module 214 may change a state of the override signal to reactivate the torque reducing module 210 and to deactivate the torque control module 216. Alternatively, the control module 214 may generate a different signal (e.g., a reinstate signal) to reactivate the torque reducing module 210 and to deactivate the torque control module 216. Accordingly, when the vehicle and the trailer begin moving forward at a speed greater than the threshold, the reinstated safety system can mitigate any unintended acceleration.

The control module 214 may determine the threshold in many ways. For example, the threshold may be a predetermined number such as 5 miles per hour. Alternatively, the control module 214 may determine the threshold based on the mass of the trailer. For example, the threshold may be proportional to the mass of the trailer.

The system 200 may determine the mass of the trailer in many ways. For example, since different trailers use different connectors, the system 200 may determine the mass of the vehicle based on the number of pins on the trailer light connector 204. Alternatively, the system 200 may determine the mass of the vehicle based on the number of circuits completed (e.g., loads connected to the power supply output by the trailer light connector 204) when the trailer light connector 204 is plugged into the trailer connector 204-1.

In some implementations, the trailer mass determination module 218 may determine the mass of the trailer based on data processed by the transmission control system 112 and/or other control systems of the vehicle. The trailer mass determination module 218 may output the mass of the trailer to control module 214.

Additionally, the control module 214 may use the gradient of the road as a factor to determine when to deactivate and reactivate the safety system. The control module 214 may determine the gradient based on various factors. For example, the factors may include the driver inputs, torque output to the wheels based on the driver inputs, expected acceleration based on the driver inputs, the speed of the vehicle, and/or other data processed by one or more control systems of the vehicle.

The control module 214 may use the gradient alone or in combination with the mass of the trailer to determine when to deactivate and reactivate the safety system. For example, if the gradient and/or the mass are less than their respective threshold values, the control module 214 may not deactivate the safety system. Additionally, the control module 214 may determine the speed threshold based on the gradient alone or in combination with the mass of the trailer.

Figure 3:
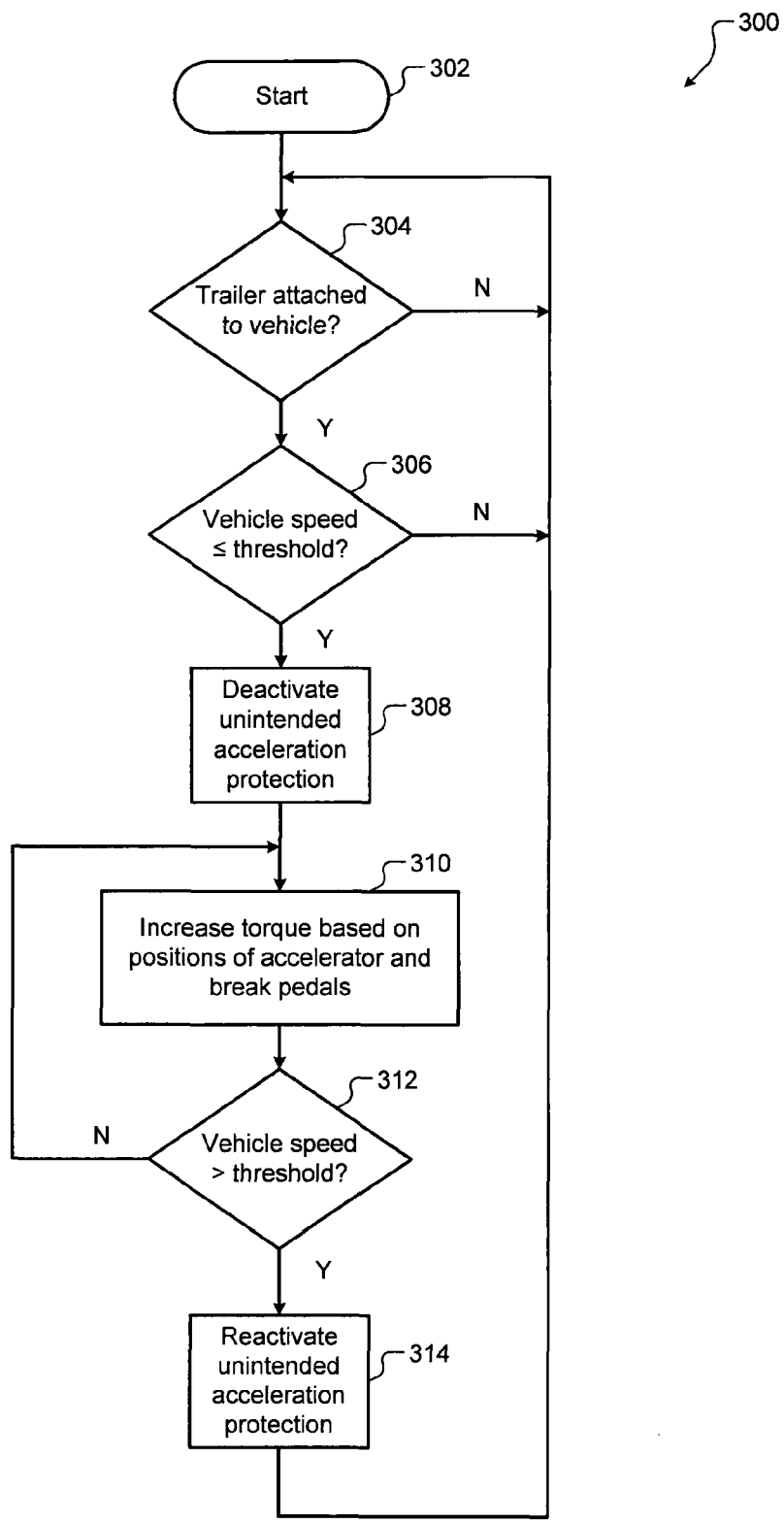
FIG. 3 is a flowchart of a method for safely overriding unintended acceleration protection in vehicles towing trailers according to the present disclosure.

Referring now to FIG. 3, a method 300 according to the present disclosure is shown. The method 300 temporarily deactivates the safety system when a vehicle towing a trailer is at rest and is starting from rest on an incline. The method 300 automatically reactivates the safety system when the speed of the vehicle exceeds a threshold.

Control begins at 302. At 304, control determines whether a trailer is attached to the vehicle. At 306, if a trailer is attached to the vehicle, control determines whether the speed of the vehicle is less than or equal to a threshold. At 308, if the speed of the vehicle is less than or equal to the threshold, control deactivates the safety system. At 310, control increases torque output to the wheels of the vehicle based on the positions of the accelerator pedal and the break pedal. At 312, control determines whether the speed of the vehicle is greater than the threshold. Control returns to 310 if the speed of the vehicle is less than or equal to the threshold. At 314, if the speed of the vehicle is greater than the threshold, control reactivates the safety system, and control returns to 304.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
   a trailer sensing module that senses when a trailer is attached to a vehicle;
   a position sensing module that senses positions of an accelerator pedal and a brake pedal of the vehicle;
   a torque reducing module that reduces torque output to wheels of the vehicle when both the accelerator pedal and the brake pedal are pressed; and
   an override control module that selectively deactivates the torque reducing module (i) when the trailer is attached to the vehicle, (ii) when the vehicle is starting from rest, and (iii) until the vehicle is reaches a speed that is greater than or equal to a threshold.

2. The system of claim 1, wherein the override control module reactivates the torque reducing module when the trailer is attached to the vehicle and when the speed is greater than the threshold.

3. The system of claim 1, further comprising a torque control module that increases torque output to the wheels based on the positions of the accelerator pedal and the brake pedal when:
   the trailer is attached to the vehicle;
   both the accelerator pedal and the brake pedal are pressed; and
   the speed of the vehicle is less than or equal to the threshold.

4. The system of claim 1, wherein the trailer sensing module senses that the trailer is attached to the vehicle when a trailer light connector of the vehicle is plugged into a corresponding connector of the trailer.

5. The system of claim 1, wherein the threshold is less than or equal to 5 miles per hour.

6. The system of claim 1, further comprising a mass determination module that determines a mass of the trailer, wherein the threshold is based on the mass of the trailer.

7. The system of claim 6, wherein the mass determination module determines the mass of the trailer based on a number of pins of a trailer light connector of the vehicle, wherein the trailer light connector plugs into a corresponding connector of the trailer.

8. A method comprising:
   sensing when a trailer is attached to a vehicle;
   sensing positions of an accelerator pedal and a brake pedal of the vehicle;
   using a torque reducing system to reduce torque output to wheels of the vehicle when both the accelerator pedal and the brake pedal are pressed; and
   selectively deactivating the torque reducing system (i) when the trailer is attached to the vehicle, (iii) when the vehicle is starting from rest, and (iii) until the vehicle is reaches a speed that is greater than or equal to a threshold.

9. The method of claim 8, further comprising reactivating the torque reducing system when the trailer is attached to the vehicle and when the speed is greater than the threshold.

10. The method of claim 8, further comprising increasing torque output to the wheels based on the positions of the accelerator pedal and the brake pedal when:
    the trailer is attached to the vehicle;
    both the accelerator pedal and the brake pedal are pressed; and
    the speed of the vehicle is less than or equal to the threshold.

11. The method of claim 8, further comprising:
    detecting when a trailer light connector of the vehicle is plugged into a corresponding connector of the trailer; and
    determining that the trailer is attached to the vehicle when the trailer light connector of the vehicle is plugged into a corresponding connector of the trailer.

12. The method of claim 8, further comprising setting the threshold to less than or equal to 5 miles per hour.

13. The method of claim 8, further comprising:
    determining a mass of the trailer; and
    setting the threshold based on the mass of the trailer.

14. The method of claim 13, further comprising determining the mass of the trailer based on a number of pins of a trailer light connector of the vehicle, wherein the trailer light connector plugs into a corresponding connector of the trailer.

* * * * *